US010645615B2

(12) United States Patent
Wei et al.

(10) Patent No.: US 10,645,615 B2
(45) Date of Patent: May 5, 2020

(54) METHOD AND APPARATUS FOR ESTABLISHING BEARERS IN A WIRELESS COMMUNICATION SYSTEM

(71) Applicants: HON HAI PRECISION INDUSTRY CO., LTD., New Taipei (TW); NATIONAL TAIWAN UNIVERSITY, Taipei (TW)

(72) Inventors: Hung-Yu Wei, Taipei (TW); Chia-Fu Lee, Taipei (TW); Chun-Ting Chou, Taipei (TW)

(73) Assignees: HON HAI PRECISION INDUSTRY CO., LTD., New Taipei (TW); NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 16/164,821

(22) Filed: Oct. 19, 2018

(65) Prior Publication Data
US 2019/0159070 A1    May 23, 2019

Related U.S. Application Data

(60) Provisional application No. 62/587,673, filed on Nov. 17, 2017.

(51) Int. Cl.
*H04W 28/12* (2009.01)
*H04W 28/02* (2009.01)
(Continued)

(52) U.S. Cl.
CPC ........... *H04W 28/12* (2013.01); *H04L 47/765* (2013.01); *H04L 47/781* (2013.01); *H04L 47/803* (2013.01); *H04W 28/0247* (2013.01); *H04W 28/0252* (2013.01); *H04W 72/042* (2013.01); *H04W 76/10* (2018.02); *H04W 72/0406* (2013.01)

(58) Field of Classification Search
CPC . H04W 28/12; H04W 76/10; H04W 28/0247; H04W 76/12; H04L 47/781; H04L 47/803
See application file for complete search history.

(56) References Cited

U.S. PATENT DOCUMENTS 9,743,312 B1 * 8/2017 Malhotra .......... H04W 28/0268
2011/0199947 A1 * 8/2011 Strobl ................... H04W 76/15
370/310

(Continued)

FOREIGN PATENT DOCUMENTS

WO    2006083131 A1    8/2006
WO    2017070895 A1    5/2017
WO    2017125143 A1    7/2017

*Primary Examiner* — Mohammad S Anwar
(74) *Attorney, Agent, or Firm* — ScienBiziP, P.C.

(57) ABSTRACT

A method for establishing bearers in a wireless communication system is provided. The wireless communication system includes a user equipment (UE), a base station, a core network, and a mobile edge computing (MEC) entity. The method includes the following actions. A first bearer between the UE and the MEC entity is established. The first bearer transports at least one data flow. Whether the at least one data flow forms a feedback loop is determined. A second bearer between the UE and the MEC entity is configured when the at least one data flow forms the feedback loop.

17 Claims, 7 Drawing Sheets

(51) Int. Cl.
   *H04W 72/04* (2009.01)
   *H04W 76/10* (2018.01)
   *H04L 12/911* (2013.01)
   *H04L 12/927* (2013.01)
   *H04L 12/919* (2013.01)

(56) References Cited

U.S. PATENT DOCUMENTS

| | | | | |
|---|---|---|---|---|
| 2012/0087330 | A1* | 4/2012 | Zhu | H04W 28/24 370/329 |
| 2012/0163168 | A1* | 6/2012 | Choi | H04W 28/0289 370/230 |
| 2014/0308953 | A1* | 10/2014 | Park | H04W 76/16 455/436 |
| 2015/0131535 | A1* | 5/2015 | Wallentin | H04W 76/15 370/329 |
| 2017/0332428 | A1* | 11/2017 | Wu | H04W 76/27 |
| 2017/0366467 | A1* | 12/2017 | Martin | H04L 47/6265 |

* cited by examiner

METHOD AND APPARATUS FOR ESTABLISHING BEARERS IN A WIRELESS COMMUNICATION SYSTEM

CROSS REFERENCE

This application claims the benefit and priority to of U.S. Provisional Application Ser. No. 62/587,673, filed on Nov. 17, 2017, and entitled "Signaling to find the coupled flow", which is incorporated herein by reference in its entirety.

FIELD

The present disclosure generally relates to a method and apparatus for establishing bearers in a wireless communication system.

BACKGROUND

The fifth generation (5G) new radio (NR) wireless communication system supports a Mobile Edge Computing (MEC) feature. Mobile edge computing may be used to deploy applications and services to provide computing resources, storage capacity and connectivity to mobile users. Mobile edge computing reduces latency to milliseconds and allows for constant connectivity. In addition, when the edge network experiences high traffic, the edge may negotiate with the cloud to maintain a quick and reliable connection. Additionally, it provides access to user traffic and radio network information that can be used by application providers for enhanced user experience. However, a number of challenging issues arise in distributing tasks of an application among edge and other network entities. To manage and optimize use of resources across multiple network entities for ensuring the performance is a difficult proposition.

SUMMARY

In one aspect of the present disclosure, a method for establishing bearers in a wireless communication system is provided. The wireless communication system includes a user equipment (UE), a base station, a core network, and a mobile edge computing (MEC) entity. The method includes the following actions. A first bearer between the UE and the MEC entity is established. The first bearer transports at least one data flow. Whether the at least one data flow forms a feedback loop is determined. A second bearer between the UE and the MEC entity is configured when the at least one data flow forms the feedback loop.

In another aspect of the present disclosure, a UE is provided. The UE includes a processor configured to perform the following instructions. A first bearer between the UE and the MEC entity is established. The first bearer transports at least one data flow. Whether the at least one data flow forms a feedback loop is determined. A second bearer between the UE and the MEC entity is configured when the at least one data flow forms the feedback loop.

In yet another aspect of the present disclosure, a MEC entity is provided. The MEC entity includes a processor configured to perform the following instructions. A first bearer between the UE and the MEC entity is established. The first bearer transports at least one data flow. Whether the at least one data flow forms a feedback loop is determined. A second bearer between the UE and the MEC entity is configured when the at least one data flow forms the feedback loop.

DETAILED DESCRIPTION

Figure 1:
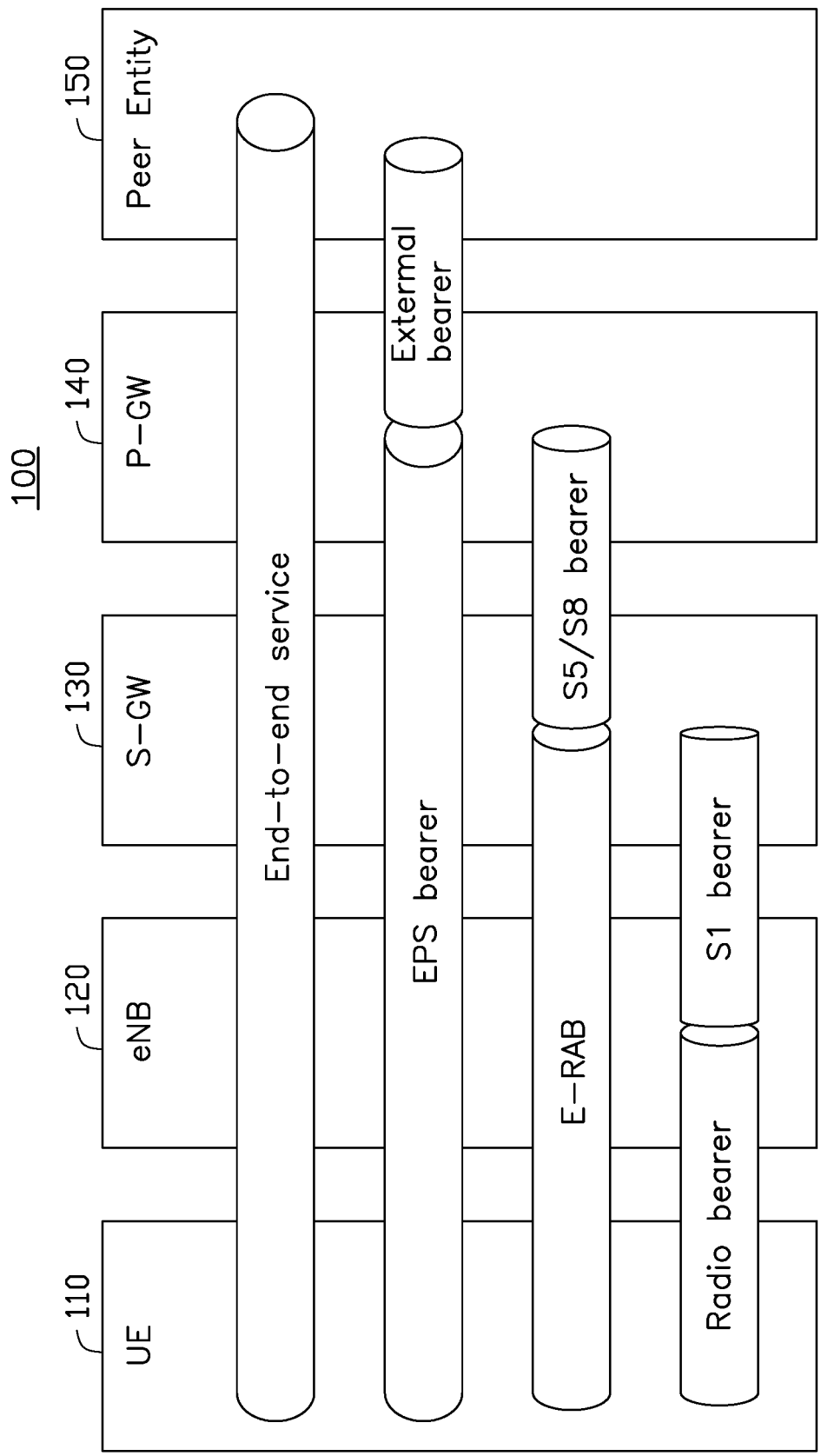
FIG. 1 is a schematic diagram of a bearer service architecture according to an exemplary implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

Several definitions that apply throughout the present disclosure will now be presented. The term "coupled" is defined as connected, whether directly or indirectly through intervening components, and is not necessarily limited to physical connections. The connection can be such that the objects are permanently connected or releasably connected.

In the present disclosure, a base station may include, but is not limited to, a node B (NB) as in the Universal Mobile Telecommunication System (UMTS), as in the LTE-A, a radio network controller (RNC) as in the UMTS, a base station controller (BSC) as in the GSM (Global System for Mobile Communication)/GERAN (GSM EDGE Radio Access Network), a ng-eNB as in an Evolved Universal Terrestrial Radio Access (E-UTRA) base station in connection with the 5G Core Network (5GC), a next generation node B (gNB) as in the 5G Access Network (5G-AN), an RRH (Remote Radio Head), a TRP (transmission and reception point), a cell, and any other apparatus capable of controlling radio communication and managing radio resources within a cell. The base station may connect to serve one or more UE(s) through a radio interface to the network.

In the present disclosure, a UE may include, but is not limited to, a mobile station, a mobile terminal or device, and a user communication radio terminal. For example, a UE may be a portable radio equipment, which includes, but is not limited to, a mobile phone, a tablet, a wearable device, a sensor, a personal digital assistant (PDA) with wireless communication capability, and other wireless devices equipping with an LTE access module or an 5G NR (New Radio) access module. In the present disclosure, the UE is configured to communicate with a radio access network via the base station.

The UE or the base station may include, but is not limited to, a transceiver, a processor, a memory, and a variety of computer-readable media. The transceiver having transmitter and receiver configured to transmit and/or receive data. The processor may process data and instructions. The processor may include an intelligent hardware device, e.g., a central processing unit (CPU), a microcontroller, or an ASIC. The memory may store computer-readable, computer-executable instructions (e.g., software codes) that are configured to cause processor to perform various functions. The memory may include volatile and/or non-volatile memory. The memory may be removable, non-removable, or a combination thereof. Exemplary memories include solid-state memory, hard drives, optical-disc drives, and etc. The computer storage media stores information such as computer-readable instructions, data structures, program modules or other data. The computer-readable media can be any available media that can be accessed and include both volatile and non-volatile media, removable and non-removable media. By way of example, and not limitation, the computer-readable media may comprise computer storage media and communication media. The computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices.

In the present disclosure, a MEC entity is deployed at the edge of the cellular network. For example, the MEC entity is implemented on a cellular base station, or other edge nodes, and the MEC entity is coupled to the core network of the cellular network. The MEC entity may include one or more hosts or servers. The host or server may provide one or more MEC applications or services on a MEC platform. The MEC applications or services may be provided by various equipment vendors, service providers or third-parties. The host or server provides computing resources, and storage capacity for the service provides to flexibly and rapidly deploy the services within the Radio Access Network (RAN) to improve the service quality and the network efficiency.

The MEC entity may include one or more controllers. The controller may be an orchestrator or a manager, configured to perform management. For example, the controller maintains the deployed servers or host. The controller may be responsible for the management of the MEC applications and the MEC platform. The controller may be responsible for managing the resources of the virtualized the infrastructure.

FIG. 1 is a schematic diagram of a bearer service architecture according to an exemplary implementation of the present disclosure. A bearer is a virtual concept defining how the data packet is transported across the network. The bearer requires the establishment of a virtual connection between two endpoints. In the present disclosure, a bearer is uniquely identified by a source IP address, a destination IP address, and a specific quality of service (QoS) parameter. The QoS parameters associated to the bearer may include, QoS class identifier (QCI), an allocation and retention priority (ARP), a guaranteed bit rate (GBR), and an aggregate maximum bit rate (AMBR).

As shown in FIG. 1, an LTE network system provides end-to-end service between a UE 110 and a peer entity 150. An LTE evolved packet system (EPS) bearer provides user plane connectivity between a UE 110 and a PDN gateway (P-GW) 140. An EPS bearer includes an E-UTRAN radio access bearer (E-RAB), and a S5/S8 bearer.

An E-RAB transports the packets of an EPS bearer between a UE 110 and an EPC (S-GW 130). The E-RAB uniquely identifies the concatenation of an S1 bearer and the corresponding data radio bearer. A S5/S8 bearer transports the packets of an EPS bearer between an S-GW 130 and a P-GW 140. A data radio bearer transports the packets of an EPS bearer between a UE 110 and one or more eNodeB (eNB) 120. An S1 bearer transports the packets of an E-RAB between an eNB 120 and a Serving GW (S-GW) 130.

Figure 2:
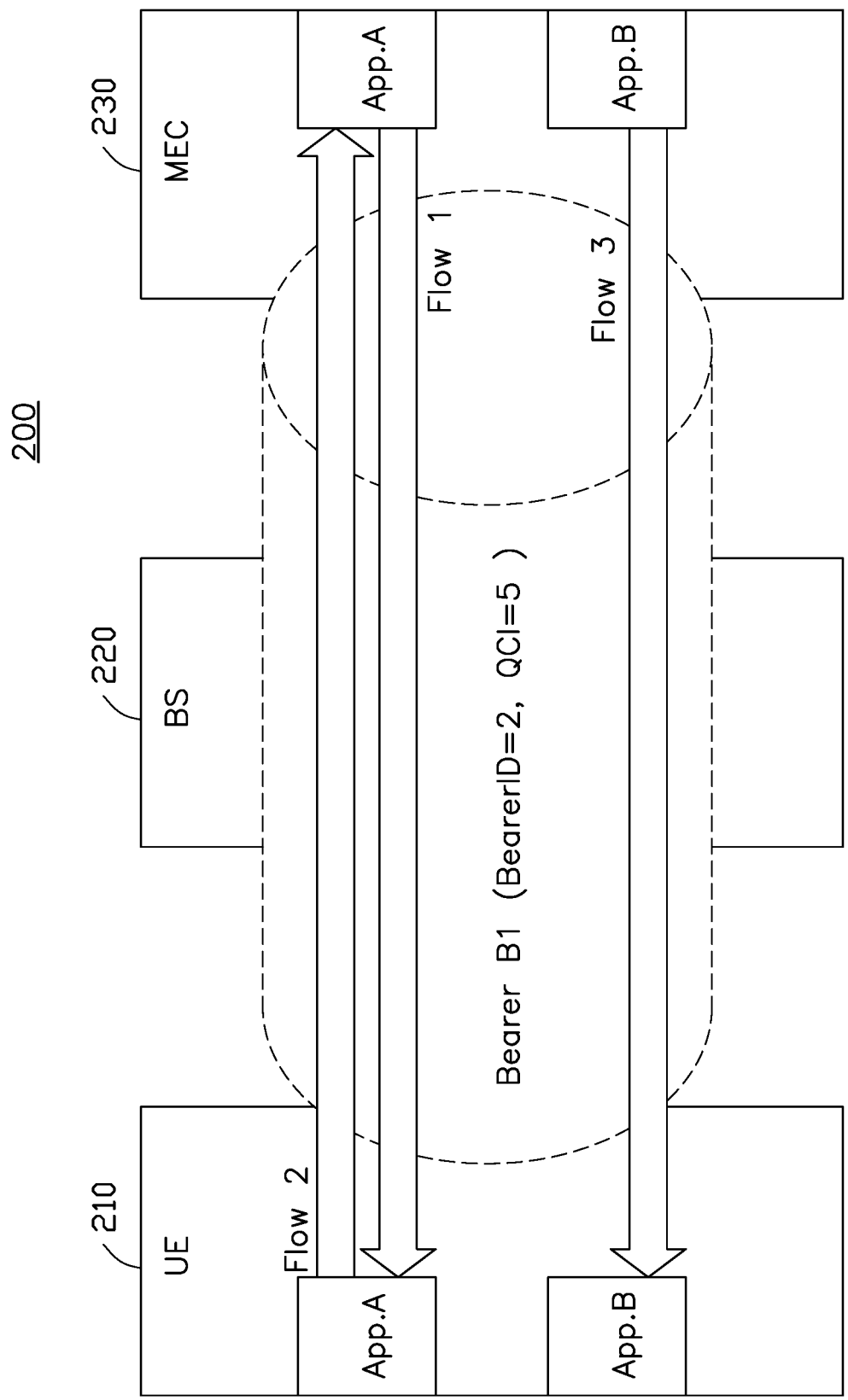
FIG. 2 is a schematic diagram for illustrating a resource usage of multiple data flows transported on a bearer in a wireless communication system according to an exemplary implementation of the present disclosure.

FIG. 2 is a schematic diagram 200 for illustrating a resource usage of multiple data flows transported on a bearer in a wireless communication system according to an exemplary implementation of the present disclosure. The wireless communication system includes a UE 210, a base station (BS) 220, and a MEC entity (MEC) 230. In this implementation, there are two applications provide by the MEC 230 to the UE 210. For example, the first application (App.A) is an online game, which requires both uplink and downlink transmissions, and therefore generates an uplink data flow (e.g., Flow 2) first and then a downlink data flow (e.g., Flow 1). On the other hand, the second application (App.B) is a tool for downloading a file, which requires only downlink transmissions, and therefore generates a downlink data flow (e.g., Flow 3). The data flows (e.g., 1, 2, and 3) are transported on a bearer (e.g., B1) with a BearerID=2 and a QCI=5.

In a network entity (e.g., UE 210, BS 220, or MEC 230), there are buffers to store uplink and downlink packets for each bearer of a UE. However, the size of the buffer for storing data packets is limited. When a buffered packet is not transmitted for a certain period of time, the buffered packet will be discarded. Different data flows in the same bearers may follow the same queueing policy, e.g., the first in first out (FIFO) policy or the random access policy.

For example, when both data flow 1 and data flow 3 are transmitted from the MEC 230 to the BS 220 and the data flow 3 comes in the buffer before the data flow 1, the data packets of data flow 1 may be dropped after a certain period of time (according to FIFO policy). In another example, when both data flow 1 and data flow 3 are transmitted from the MEC 230 to the BS 220 and the data flow 3 is randomly selected to be served, the data packets of data flow 1 may be dropped after a certain period of time (according to random access policy). Afterwards, without receiving the downlink data flow 1, the application A times out and then retransmits the uplink data flow 2 (even though the data flow 2 is transmitted successfully to the MEC 230 before). Therefore, since the downlink data flow (e.g., Flow 1) and the uplink data flow (e.g., Flow 2) forms a feedback loop, the dropped packets of the downlink data flow 1 results in the retransmission of the uplink data flow 2. This leads to resource wasting of the wireless communication system.

Table 1 shows the transmission resource usage of the wireless communication system as shown in FIG. 2. Specifically, the data flow 2 is transmitted from the UE 210 to the MEC 230 via BS 220, and therefore the transmission resource usage is one (unit of resource) for UE and one (unit of resource) for BS. Afterwards, the data flow 1 is scheduled to be transmitted from the MEC 230 to the UE 210 via BS 220. However, since the data packets of flow 1 in the buffer of BS 220 are dropped, the transmission resource usage is one for MEC. Alternatively, the data flow 3 are successfully transmitted to the UE 210, and therefore the transmission resource usage is one for MEC and one for BS. After the application A times out, the data flow 2 is retransmitted from the UE 210 to the MEC 230 via BS 220, and therefore the transmission resource usage is one for UE and one for BS. Finally, the data flow 1 is successfully transmitted from the MEC 230 to the UE 210 via BS 220, and therefore the transmission resource usage is one for MEC and one for BS. In summary, the total transmission resource usage is 2 for UE, 4 for BS, and 3 for MEC.

TABLE 1

|        | UE Usage unit | BS Usage unit | MEC Usage unit |
|--------|---------------|---------------|----------------|
| Flow 1 |               | 1             | 2              |
| Flow 2 | 2             | 2             |                |
| Flow 3 |               | 1             | 1              |
| Total  | 2             | 4             | 3              |

Figure 3:
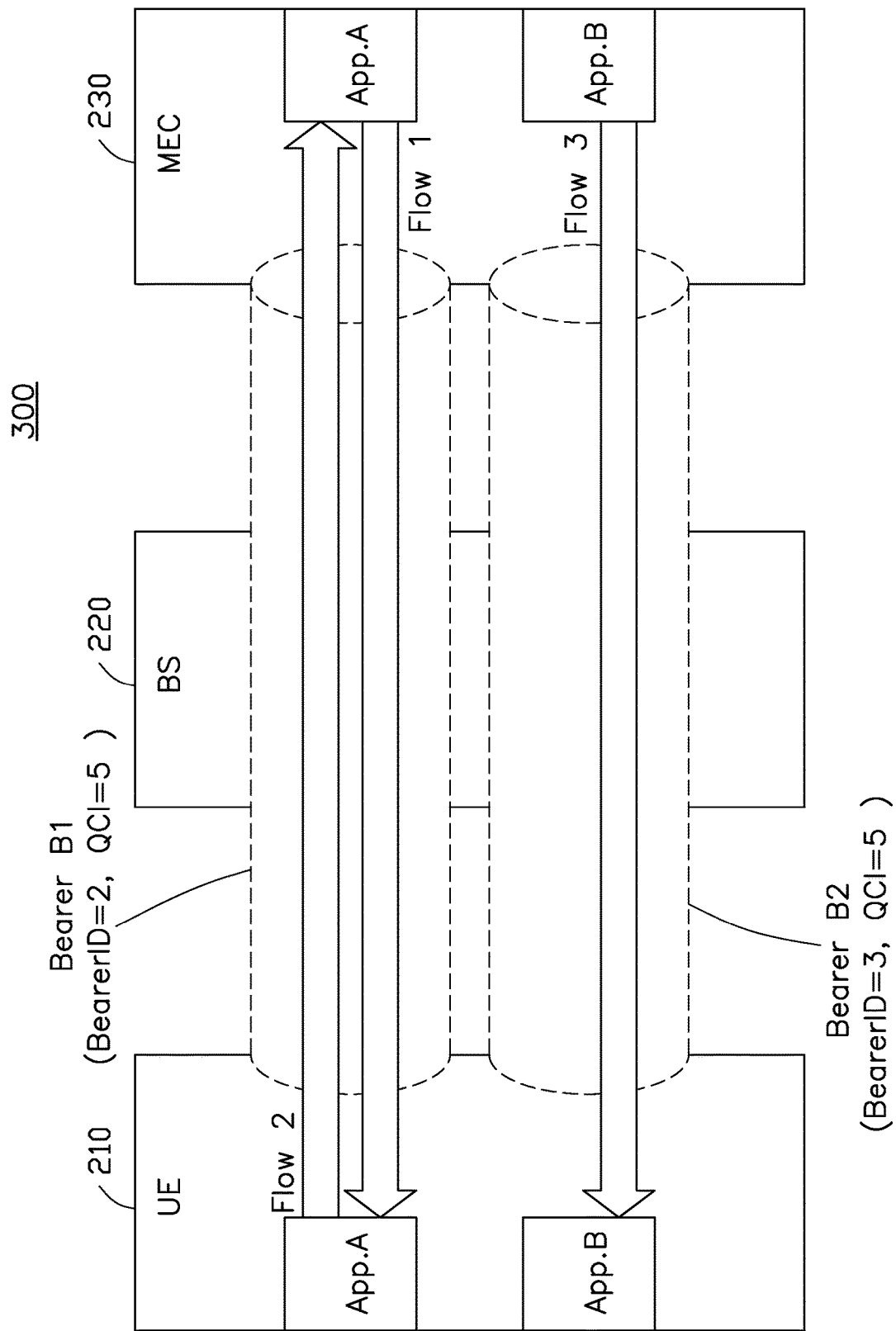
FIG. 3 is a schematic diagram for illustrating a resource usage of multiple data flows transported on two bearers in a wireless communication system according to an exemplary implementation of the present disclosure.

FIG. 3 is a schematic diagram 300 for illustrating a resource usage of multiple data flows transported on two bearers in a wireless communication system according to an exemplary implementation of the present disclosure. The wireless communication system includes a UE 210, a BS 220, and a MEC 230. In this implementation, there are two applications provide by the MEC 230 to the UE 210. For example, the first application (App.A) is an online game, which requires both uplink and downlink transmissions, and therefore generates an uplink data flow (e.g., Flow 2) first and then a downlink data flow (e.g., Flow 1). On the other hand, the second application (App.B) is a tool for downloading a file, which requires only downlink transmissions, and therefore generates a downlink data flow (e.g., Flow 3).

In this implementation, the data flows forming the feedback loop (e.g., 1, and 2) are transported on a dedicated bearer (e.g., B1) with a BearerID=2 and a QCI=5, and the other data flow(s) (e.g., 3) is transported on another bearer (e.g., B2) with a BearerID=3 and a QCI=5.

Table 2 shows the transmission resource usage of the wireless communication system with a dedicated bearer for the data flows forming the feedback loop as shown in FIG. 3. In this case, since the data flows forming the feedback loop are transmitted in the dedicated bearer, the retransmission may not be performed, and therefore the total transmission resource usage is reduced. For instance, the data flow 2 is transmitted from the UE 210 to the MEC 230 via BS 220 on the dedicated bearer (e.g., B1), and therefore the transmission resource usage is one (unit of resource) for UE and one (unit of resource) for BS. Afterwards, the data flow 1 is transmitted from the MEC 230 to the UE 210 via BS 220 on the dedicated bearer (e.g., B1), and the transmission resource usage is one for MEC and one for BS. The data flow 3 are transmitted to the UE 210, and therefore the transmission resource usage is one for MEC and one for BS via BS 220 on another bearer (e.g., B2). In summary, the total transmission resource usage is 1 for UE, 3 for BS, and 2 for MEC. In comparison with the network system without dedicated bearer, the total usage transmission resource usage of the network system with dedicated bearer is reduced.

TABLE 2

|        | UE Usage unit | BS Usage unit | MEC Usage unit |
|--------|---------------|---------------|----------------|
| Flow 1 |               | 1             | 1              |
| Flow 2 | 1             | 1             |                |
| Flow 3 |               | 1             | 1              |
| Total  | 1             | 3             | 2              |

In this implementations, the feedback loop is formed by the uplink data flow 2 and the downlink data flow 1 between the UE 210 and MEC 230. In another implementation, a feedback loop may be formed by an uplink data flow between the BS 220 and MEC 230 and a downlink data flow between the BS 220 and MEC 230. In yet another implementation, a feedback loop may be formed by an uplink data flow between the UE 210 and the BS 220 and a downlink data flow between the UE 210 and the BS 220. When the data flows transported on a bearer forms a feedback loop, the transmission or the reception of one data flow may affect the other data flows. Thus, in this disclosure, a dedicated bearer for the data flows forming the feedback is established or configured to reduce the transmission resource usage or latency so that the efficiency of the network transmission may be improved.

In one implementation, there are one default bearer between a UE and a MEC entity, and one dedicated bearer between the UE and the MEC entity configured for the data flows forming the feedback loop. In some implementations, there are one default bearer between a UE and a MEC entity, and multiple dedicated bearers between the UE and the MEC entity configured for the data flows forming the feedback loop. In some other implementations, there are one or more default bearers between a UE and a MEC entity, and one or more dedicated bearers between the UE and the MEC entity configured for the data flows forming the feedback loop.

Figure 4:
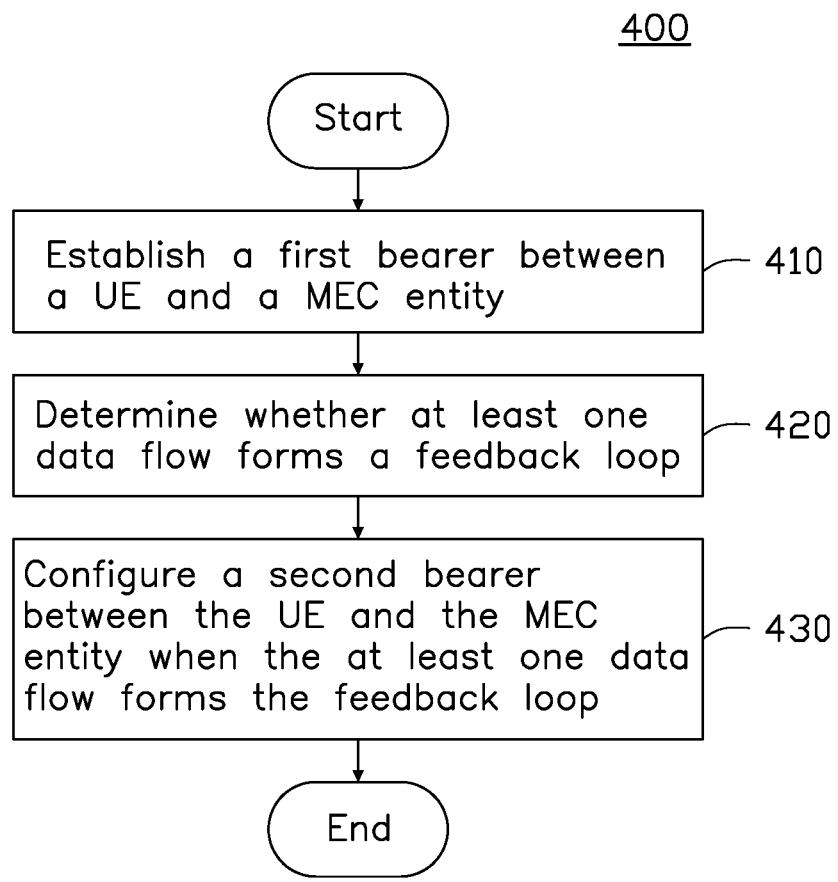
FIG. 4 is a flowchart of a method for establishing bearers in a wireless communication system according to an exemplary implementation of the present disclosure.

FIG. 4 is a flowchart of a method 400 for establishing bearers in a wireless communication system according to an exemplary implementation of the present disclosure. The wireless communication system includes a UE, a base station, a core network, and a MEC entity. The method 400 includes the following actions. In block 410, a first bearer between the UE and the MEC entity is established. The first bearer transports at least one data flow. In block 420, whether the at least one data flow forms a feedback loop is determined. In block 430, a second bearer between the UE and the MEC entity is configured when the at least one data flow forms the feedback loop.

In one implementation, the first bearer may include one or more default bearers between the UE and the MEC entity. The default bearer between the UE and the MEC entity may include one or more bearers (e.g., EPS bearers, E-RAB, external bearers, E-RABs, S5/S8 bearers, radio bearers, S1 bearers or other bears).

In one implementation, the second bearer is dedicated for the data flows forming the feedback loop. The second bearer may include one or more dedicated bearers between the UE and the MEC entity. The dedicated bearers may also include one or more bearers (e.g., EPS bearers, E-RAB, external bearers, E-RABs, S5/S8 bearers, radio bearers, S1 bearers or other bears).

In one implementation, whether the data flow transported on the first bearer forms a feedback loop is determined by a UE. For example, the UE may determine whether a MEC application or service requires both uplink and downlink transmissions. In another example, the UE identifies the type of a MEC application or service and determine whether the application or service may induce a feedback loop. For instance, an online game may induce a feedback loop since it requires real-time commands and interactions. On the other hand, downloading a file may not induce a feedback loop.

In another implementation, whether the data flow transported on the first bearer forms a feedback loop is determined by a MEC entity. For example, the MEC entity may determine whether a MEC application or service requires both uplink and downlink transmissions. In another example, the MEC entity identifies the type of a MEC application or service and determine whether the application or service may induce a feedback loop. For instance, an online game may induce a feedback loop since it requires real-time commands and interactions. On the other hand, downloading a file may not induce a feedback loop.

Figure 5:
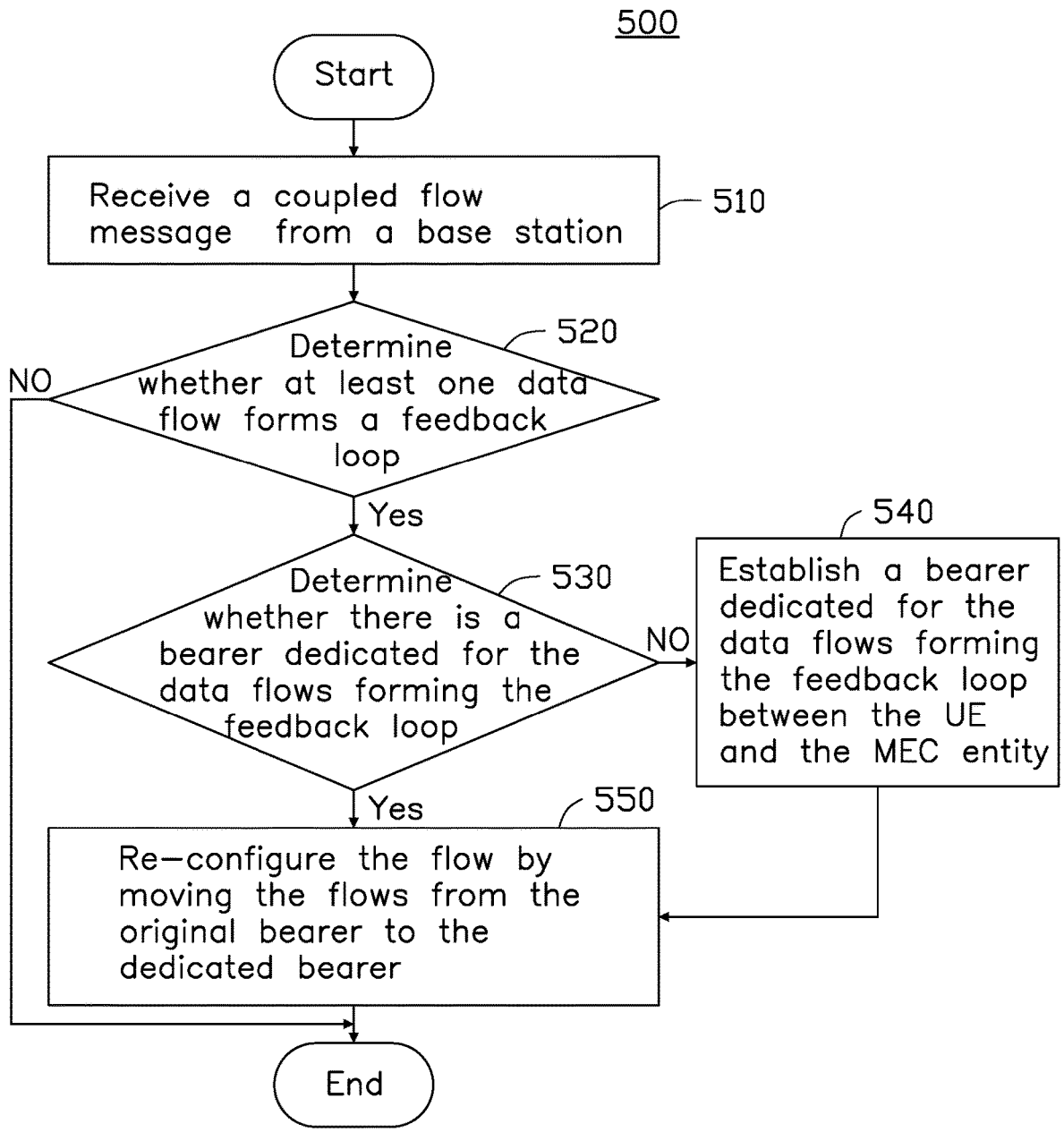
FIG. 5 is a flowchart of a method for establishing bearers in a wireless communication system according to an exemplary implementation of the present disclosure.

FIG. 5 is a flowchart of a method 500 for establishing bearers in a wireless communication system according to an exemplary implementation of the present disclosure. The wireless communication system includes a UE, a base station, a core network, and a MEC entity. The method 500 includes the following actions. In this implementation, a network entity may identify whether a feedback loop is induced. For example, a base station coupled between the UE and the MEC entity determines whether the loading of the first bearer (e.g., the original bearer or the default bearer) exceeds a threshold. When the base station identifies that the loading of the first bearer exceeds a threshold, the base station transmits a coupled flow message to the UE. In another example, the base station tracks the number of dropped packets transported on the first bearer. When the base station identifies that the number of dropped packets transported on the first bearer exceeds a threshold, the base station transmits a coupled flow message to the UE. As shown in block 510, the UE receives the coupled flow message from the base station.

Afterward, in block 520, the UE determines whether at least one data flow transported on the first bearer forms a feedback loop. In some implementations, the UE further identifies the data flows forming the feedback loop.

When the UE identifies that the data flows forms a feedback loop, the UE determines whether there is a bearer dedicated for the data flows forming the feedback loop (i.e., the dedicated bearer) as shown in block 530.

In block 540, the UE establishes a bearer dedicated for the data flows forming the feedback loop (i.e., the dedicated bearer) between the UE and the MEC entity when there is no dedicated bearer between the UE and the MEC entity.

In action 550, if there is a dedicated bearer between the UE and the MEC entity, the UE re-configures identified flows by moving the flows (forming the feedback loop) from the original bearer (or the default bearer) to the dedicated bearer.

In some implementations, after the base station identifies a feedback loop is induced, the base station transmits a coupled flow message to the MEC entity. And then, the MEC entity may perform the actions as shown in blocks 510, 520, 530, 540, and 550. For instance, the MEC entity receives the coupled flow message from the base station as shown in bloc 510, the MEC entity determines whether at least one data flow transported on the first bearer forms a feedback loop. In some implementations, the MEC entity further identifies the data flows forming the feedback loop. Afterwards, the MEC entity further determines whether there is a dedicated bearer between the UE and the MEC entity. If not, the MEC entity would establish the dedicated bearer. Otherwise, the MEC entity re-configures the identified flows by moving the flows (forming the feedback loop) from the original bearer (or the default bearer) to the dedicated bearer.

Figure 6:
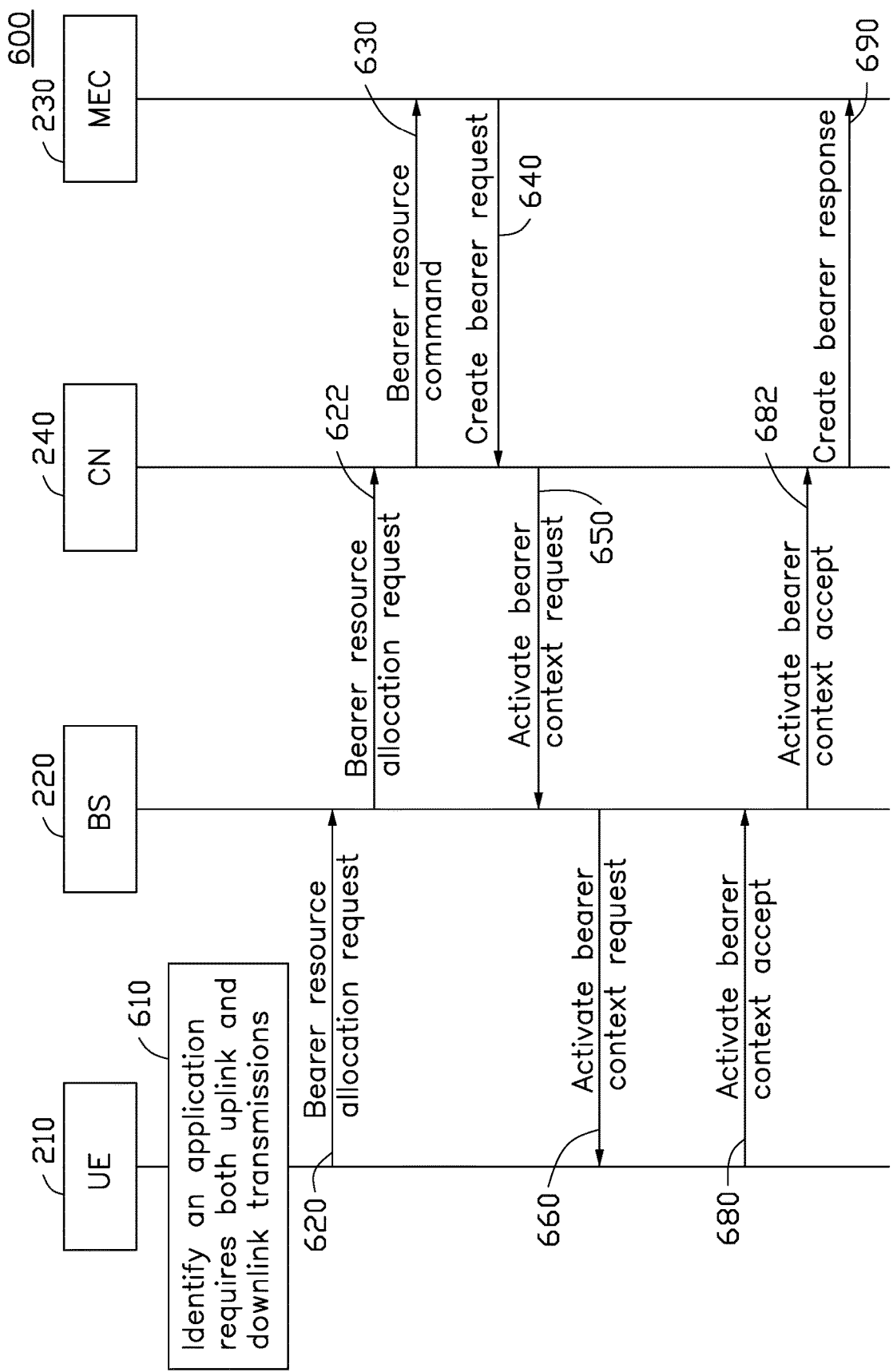
FIG. 6 is a schematic diagram of a method for configuring a dedicated bearer between a UE and a MEC entity in a wireless communication system according to an exemplary implementation of the present disclosure.

FIG. 6 is a schematic diagram of a method 600 for configuring a dedicated bearer between a UE and a MEC entity in a wireless communication system according to an exemplary implementation of the present disclosure. As shown in FIG. 6, the wireless communication system includes a UE 210, a BS 220, a core network (CN) 240, and a MEC 230. The method 600 includes the following actions. In this implementation, the establishment of the dedicated bearer is initiated by the UE 210. In action 610, the UE 210 identifies that an application supported by the MEC entity 230 requires both uplink and downlink transmissions. In action 620, the UE 210 transmits a bearer resource allocation request to the BS 220. In one implementation, the bearer resource allocation request includes a feedback indicator. The bearer resource allocation request further includes a QoS requirement, e.g., a QCI, an AMBR, and a GBR. After the BS 220 receives the bearer resource allocation request including the feedback indicator, the BS 220 forwards the bearer resource allocation request including the feedback indicator to the CN 240 as shown in action 622.

When the CN 240 receives the bearer resource allocation request including the feedback indicator, the CN 240 identifies the bearer resource allocation request is dedicated for the data flows forming the feedback loop. Thus, in action 630, the CN 240 transmits a bearer resource command to the MEC 230 for establishing the dedicated bearer. For example, the bearer resource command includes a flow QoS. In one implementation, the bearer resource command further includes a default bearerID.

After the MEC 230 receives the bearer resource command, the MEC 230 allocates the dedicated bearer resource. In action 640, the MEC 230 responds a create bearer request to the CN 240. For instance, the create bearer request may include, but not limited to, a QoS, a GBR, an ARP.

In action 650, the CN 240 transmits an activate bearer context request to the BS 220 for allocating the dedicated bearer. For example, the activate bearer context request includes a new bearerID and a QoS.

After receiving the activate bearer context request, the BS 220 allocates the bearer resource. In action 660, the BS 220 transmits an activate bearer context request.

After the UE 210 receives the activate bearer context request, the UE 210 establishes the radio bearers.

In actions 680 and 682, the UE transmits an activate bearer context accept message to the CN 240 via BS 220.

In action 690, the CN 240 transmits a create bearer response to the MEC 230. Thus, the establishment of the dedicated bearer is completed.

Figure 7:
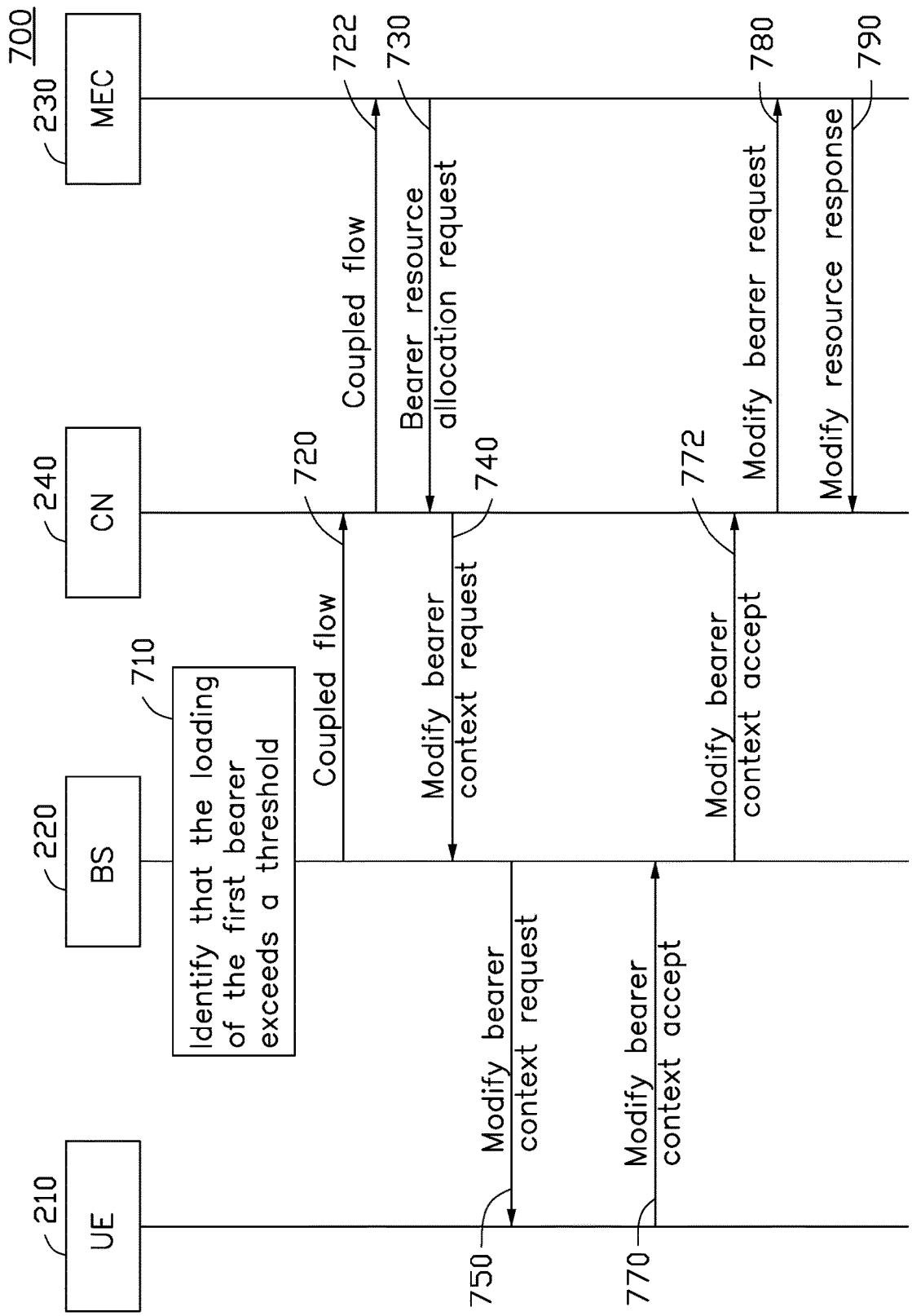
FIG. 7 is a schematic diagram of a method for configuring a dedicated bearer between a UE and a MEC entity in a wireless communication system according to an exemplary implementation of the present disclosure.

FIG. 7 is a schematic diagram of a method 700 for configuring a dedicated bearer between a UE and a MEC entity in a wireless communication system according to an exemplary implementation of the present disclosure. As shown in FIG. 7, the wireless communication system includes a UE 210, a BS 220, a CN 240, and a MEC 230. The method 700 includes the following actions. In this implementation, after a dedicated bearer between the UE 210 and the MEC 230 is established, there might be new data flows forming the feedback loop. Therefore, the reallocation of identified feedback loop from default bearer to dedicated bearer is initiated by the MEC 230 with the help of the BS 220. In action 710, the BS 220 identifies that the loading of the first bearer (e.g., the default bearer or the original bearer) exceeds a threshold. In another implementation, the BS 220 identifies that the number of dropped packets transported on the first bearer (e.g., the default bearer or the original bearer) exceeds a threshold.

In actions 720 and 722, the BS 220 transmits a coupled flow message to the MEC 230 via the CN 240. The MEC 230 may then identify whether there is a feedback loop in the first bearer after MEC 230 receiving couple flow message.

In action 730, the MEC 230 transmits a bearer resource allocation request to the CN 240 when MEC 230 identifies that an application supported by the MEC entity 230 requires both uplink and downlink transmissions. In one implementation, the bearer resource allocation request includes a feedback indicator. The bearer resource allocation request further includes a QCI, a MBR, and a GBR.

In action 740, the CN 240 transmits a modify bearer context request to the BS 220 for modifying the dedicated bearer. In one implementation, after receiving the modify bearer context request, the data flows forming the feedback loop is added to the dedicated bearer.

In action 750, the BS 220 transmits a modify bearer context request.

In actions 770 and 772, the UE transmits a modify bearer context accept message to the CN 240 via BS 220.

In action 780, the CN 240 transmits a modify bearer request to the MEC 230. In action 790, the MEC 230 responds a modify resource response to the CN 240. Thus, the modification of the dedicated bearer is completed.

In another implementation, the first bearer (e.g., the default bearer or the original bearer) is re-configured. The MEC 230 transmits a bearer resource allocation request to the CN 240, and the CN 240 transmits a modify bearer context request to the BS 220 for modifying the first bearer. After receiving the modify bearer context request, the data flows forming the feedback loop is removed from the first bearer.

Based on the above, several methods for establishing bearers in a wireless communication system are provided in this disclosure. The implementations shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for establishing bearers in a wireless communication system, comprising:
   establishing a first bearer between a user equipment (UE) and a mobile edge computing (MEC) entity, wherein the first bearer transports at least one data flow;
   determining whether the at least one data flow forms a feedback loop;
   determining whether there is a second bearer dedicated for the data flows forming the feedback loop when the at least one data flow forms the feedback loop;
   configuring the second bearer between the UE and the MEC entity when there is no the second bearer dedicated for the data flows forming the feedback loop;
   removing the data flow forming the feedback loop from the first bearer; and
   adding the data flow forming the feedback loop to the second bearer.

2. The method of claim 1, wherein the step of determining whether the at least one data flow forms the feedback loop comprises: determining whether an application supported by the MEC entity requires both uplink and downlink transmissions.

3. The method of claim 2, wherein the step of configuring the second bearer between the UE and the MEC entity comprises: transmitting a bearer resource allocation request including a feedback indicator and a QoS requirement to a core network when the application supported by the MEC entity requires both uplink and downlink transmissions.

4. The method of claim 3, wherein the step of configuring the second bearer between the UE and the MEC entity comprises:
   receiving an activate bearer context request comprising the QoS requirement, in response to the bearer resource allocation request; and
   establishing the second bearer according to the activate bearer context request.

5. The method of claim 1, wherein the step of determining whether the at least one data flow forms the feedback loop comprises:
   receiving a coupled flow message from a base station coupled to the UE and MEC entity; and
   determining whether there are data flows transported on the first bearer forming the feedback loop.

6. The method of claim 5, wherein the coupled flow message is received when the base station identifies that a loading of the first bearer exceeds a threshold.

7. The method of claim 5, wherein the coupled flow message is received when the base station identifies that the number of dropped packets exceeds a threshold.

8. A User equipment (UE), comprising:
   a processor configured to perform instruction for:
   establishing a first bearer between the UE and a mobile edge computing (MEC) entity, wherein the first bearer transports at least one data flow;
   determining whether the at least one data flow forms a feedback loop;
   determining whether there is a second bearer dedicated for the data flows forming the feedback loop when the at least one data flow forms the feedback loop;
   configuring the second bearer between the UE and the MEC entity when there is no the second bearer dedicated for the data flows forming the feedback loop;
   removing the data flows forming the feedback loop from the first bearer; and
   adding the data flows forming the feedback loop to the second bearer.

9. The UE of claim 8, wherein when determining whether the at least one data flow forms the feedback loop, the processor is further configured to perform instruction for: determining whether an application supported by the MEC entity requires both uplink and downlink transmissions.

10. The UE of claim 9, wherein when configuring the second bearer between the UE and the MEC entity, the processor is further configured to perform instruction for: transmitting a bearer resource allocation request including a feedback indicator and a QoS requirement to a core network when the application supported by the MEC entity requires both uplink and downlink transmissions.

11. The UE of claim 10, wherein when configuring the second bearer between the UE and the MEC entity, the processor is further configured to perform instruction for:
   receiving an activate bearer context request comprising the QoS requirement, in response to the bearer resource allocation request; and
   establishing the second bearer according to the activate bearer context request.

12. The UE of claim 8, wherein when determining whether the at least one data flow forms the feedback loop, the processor is further configured to perform instruction for:
- receiving a coupled flow message from a base station coupled to the UE and MEC entity; and
- determining whether there are data flows transported on the first bearer forming the feedback loop.

13. A mobile edge computing (MEC) entity, comprising: a processor configured to perform instruction for:
- establishing a first bearer between a user equipment (UE) and the MEC entity, wherein the first bearer transports at least one data flow;
- determining whether the at least one data flow forms a feedback loop;
- determining whether there is a second bearer dedicated for the data flows forming the feedback loop when the at least one data flow forms the feedback loop;
- configuring the second bearer between the UE and the MEC entity when there is no the second bearer dedicated for the data flows forming the feedback loop;
- removing the data flows forming the feedback loop from the first bearer; and
- adding the data flows forming the feedback loop to the second bearer.

14. The MEC entity of claim 13, wherein when determining whether at least one data flow forms the feedback loop, the processor is further configured to perform instruction for: determining whether an application supported by the MEC entity requires both uplink and downlink transmissions.

15. The MEC entity of claim 14, wherein when configuring the second bearer between the UE, the processor is further configured to perform instruction for: transmitting a bearer resource allocation request including a feedback indicator and a QoS requirement to a core network when the application supported by the MEC entity requires both uplink and downlink transmissions.

16. The MEC entity of claim 15, wherein when configuring the second bearer between the UE, the processor is further configured to perform instruction for:
- receiving an activate bearer context request comprising the QoS requirement, in response to the bearer resource allocation request; and
- establishing the second bearer according to the activate bearer context request.

17. The MEC entity of claim 13, wherein when determining whether the at least one data flow forms the feedback loop, the processor is further configured to perform instruction for:
- receiving a coupled flow message from a base station coupled to the UE and MEC entity; and
- determining whether there are data flows transported on the first bearer forming the feedback loop.

* * * * *